United States Patent [19]

Bender et al.

[11] 4,047,500
[45] Sept. 13, 1977

[54] MILKING APPARATUS AND METHOD FOR OPERATING SAME

[75] Inventors: Lloyd F. Bender; Rolyn A. Schmid, both of Hayward, Wis.

[73] Assignee: Bender Machine Works, Inc., Hayward, Wis.

[21] Appl. No.: 725,785

[22] Filed: Sept. 23, 1976

[51] Int. Cl.² ............................................. A01J 9/08
[52] U.S. Cl. ............................................... 119/14.11
[58] Field of Search ............... 119/14.11, 14.08, 14.03, 119/14.01, 14.09

[56] References Cited

U.S. PATENT DOCUMENTS

| | | | |
|---|---|---|---|
| 1,910,830 | 5/1933 | Hapgood | 119/14.11 |
| 2,608,951 | 9/1952 | Kingston | 119/14.11 X |
| 2,678,627 | 5/1954 | Kingston | 119/14.11 |
| 2,910,965 | 11/1959 | Cann, Sr. | 119/14.11 |
| 2,982,247 | 5/1961 | Varese et al. | 119/14.11 |

*Primary Examiner*—Hugh R. Chamblee
*Attorney, Agent, or Firm*—James E. Nilles

[57] ABSTRACT

Dairy cow milking apparatus comprises a vacuum system including a main vacuum line installed along a plurality of milking stalls and a plurality of spaced-apart vacuum ports along the main vacuum line. Manually operable shut-off valves are provided for selectively and independently opening and closing each vacuum port. The apparatus also comprises a mobile milking unit selectively movable from one position to another along said main vacuum line and said milking stalls. The unit comprises vacuum operated components including a plurality of teat claw assemblies for milking a plurality of cows simultaneously. A pair of flexible auxiliary vacuum lines are provided on the milking unit and each auxiliary vacuum line has one end connected to operate all the vacuum operated components. Each auxiliary vacuum line has its other end adapted for connection to a vacuum port in the main vacuum line.

In accordance with the method, at least one auxiliary vacuum line is always connected to a port in the main vacuum line to permit uninterrupted milking as said mobile milking unit is moved from one position to another to milk different groups of cows. Check valves are provided in each auxiliary vacuum line to close an auxiliary vacuum line whenever it is disconnected from a vacuum port.

6 Claims, 5 Drawing Figures

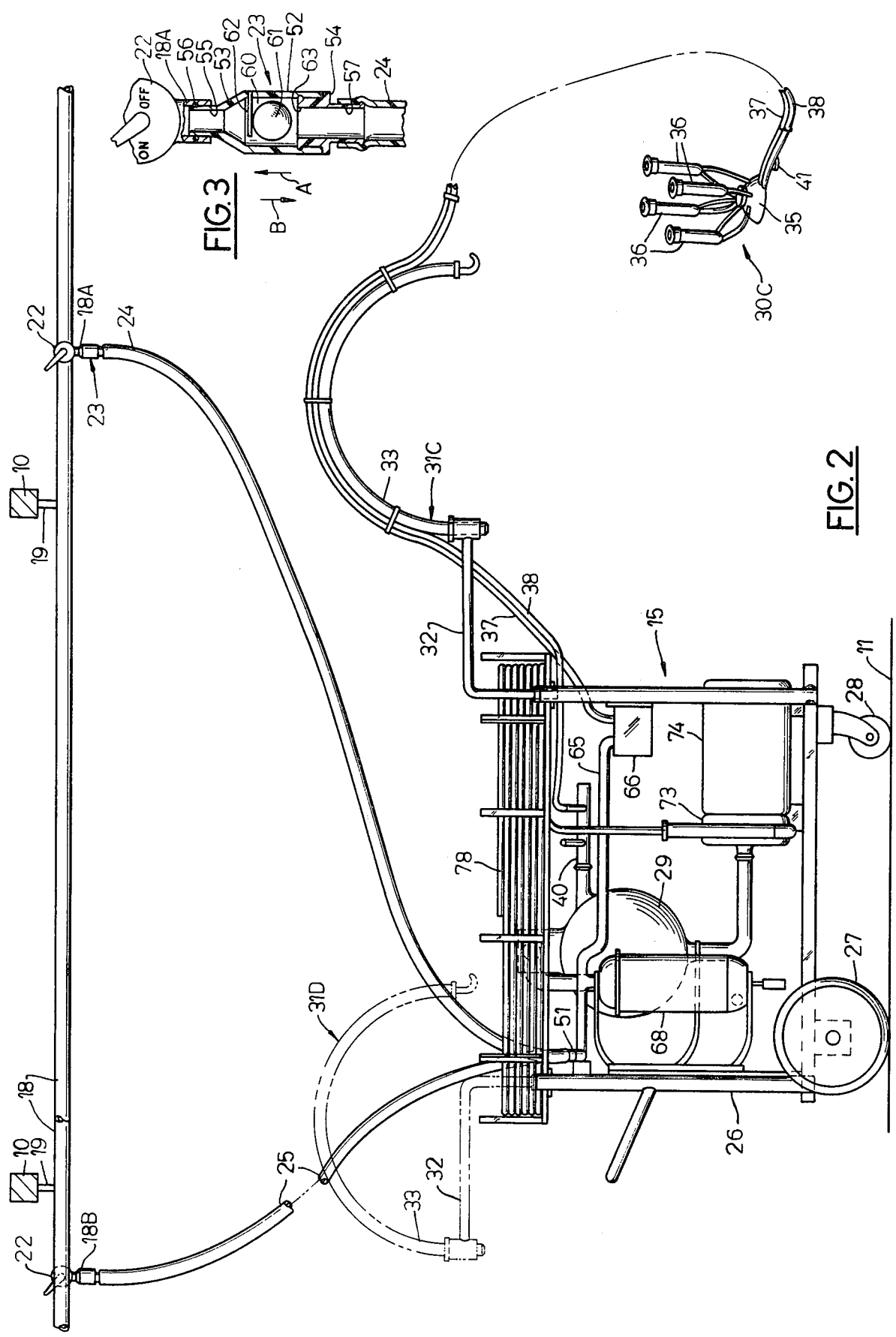

MILKING APPARATUS AND METHOD FOR OPERATING SAME

BACKGROUND OF THE INVENTION

1. Field of Use

This invention relates generally to dairy cow milking apparatus and to a method for operating the same. The apparatus comprises a vacuum operated mobile milking unit for milking several cows simultaneously and a vacuum system including a stationarily mounted multiported main vacuum line for supplying vacuum to the mobile milking unit. The method provides for moving the mobile unit from one group of cows to another without interrupting milking operations in progress or interrupting the vacuum supply from the main vacuum line.

2. Description of the Prior Art

Dairy cow milking apparatus presently used in the dairy industry encompasses various types of milking units. However, such units typically employ a milk receiver and at least one teat claw assembly (including a plurality of teat cups) and such units require a vacuum system connectable to operate the teat cups in a pulsed manner and to draw milk from the teat cups to the milk receiver from whence it is pumped to a bulk storage tank.

Milking units may take the form of stationary units, portable units or mobile units.

Typically, several stationary units are placed in fixed locations in a barn and are supplied from a stationary main vacuum line having branch lines to each unit. Such a permanent installation is relatively costly and inflexible.

A portable unit usually includes a single teat claw assembly and milk receiver and is carried by the operator from one stall to another and is connectable to the most conveniently located port of a multiported stationarily mounted main vacuum line which extends through the milking area of the barn. Portable units normally permit milking of only one cow at a time and thus prolong a milking operation and must be carried from one place to another. Furthermore, the portable unit cannot be operated when disconnected from the vacuum system.

A mobile milking unit having a plurality of teat claw assemblies for milking several cows simultaneously and incorporating its own vacuum system, including an electric motor and vacuum pump, is moved from one group of cows to another as required. U.S. Pat. application Ser. No. 600,813 filed July 31, 1975 which issued as U.S. Pat. No. 4,034,711 on July 12, 1977 filed by Bender and Schmid for "Mobile Milk Unit and System" discloses the latter arrangement.

Such a mobile unit is very convenient and efficient but is relatively costly since it contains its own vacuum system. Furthermore, it is not adapted for use with existing installations which employ stationarily mounted multiported main vacuum lines and, even if so adapted, the costly self-contained vacuum system is redundant.

SUMMARY OF THE INVENTION

Apparatus for milking dairy cows and a method for operating the same are disclosed. The apparatus comprises a vacuum operated mobile milking unit selectively movable from one group of cows to another and a stationarily mounted vacuum system including a main vacuum line extending along the milking area and having spaced apart selectively usable vacuum ports therealong for supplying vacuum to the modile milking unit. The mobile milking unit comprises vacuum operated components, such as a plurality of teat claw assemblies and a milk receiver, and further comprises first and second flexible auxiliary vacuum lines, each of which alone is connectable to a vacuum port to enable operation of the vacuum operated components. Each vacuum port has a manually operable shut-off valve for closing th port when not in use and each secondary vacuum line has a check valve therein for closing the line when it is disconnected from a vacuum port.

The method involves the steps of: placing the mobile unit near a first group of cows; connecting the first and second auxiliary vacuum lines to first and second vacuum ports near first and second groups of cows, respectively; attaching the teat claw assemblies to the first group of cows; completing milking of some cows in the first group and detaching the appropriate teat claw assemblies; reattaching the available teat claw assemblies to some cows in the second group and commencing milking; completing the milking of the remaining cows in the first group and detaching the appropriate teat claw assemblies; disconnecting the first auxiliary vacuum line from the first vacuum port; moving the mobile milking unit nearer the second group of cows while leaving the second auxiliary vacuum line connected and while continuing the milking of the cows in the second group; reattaching the available teat claw assemblies to the remaining cows in the second group and commencing milking thereof; reconnecting the first auxiliary vacuum line to a third vacuum port near a third group of cows in readiness for further movement of the milking unit; completing milking of some cows in the second group; reattaching the available teat claw assemblies to some cows in the third group; and repeating the above steps as required.

Milking apparatus and a method for operating the same in accordance with the invention offer advantages over the prior art. For example, the mobile unit is easy to move from one location to another; it is less costly than known mobile units since it requires no self-contained vacuum system; it is compatible with and can make use of presently installed stationary main vacuum lines; it is continually supplied with vacuum and, therefore, milking operations in progress need not be interrupted as the unit is moved nearer the next group of cows to be milked; and all teat claw assemblies can be kept in operation. It should be noted that one problem with vacuum operated teat claw assemblies is that the assembly becomes detached from the cow and falls to the floor if the vacuum supply is interrupted. Other objectes and advantages of the invention will hereinafter appear.

DRAWINGS

FIG. 2 is an enlarged side elevation view of the apparatus shown in FIG. 1;

FIG. 3 is an enlarged cross-section view of manually operable shut-off valve for an access port in the main vacuum line and a check valve in the auxiliary vacuum line of the mobile milking unit shown in FIGS. 1 and 3.

DESCRIPTION OF A PREFERRED EMBODIMENT

Figure 1:
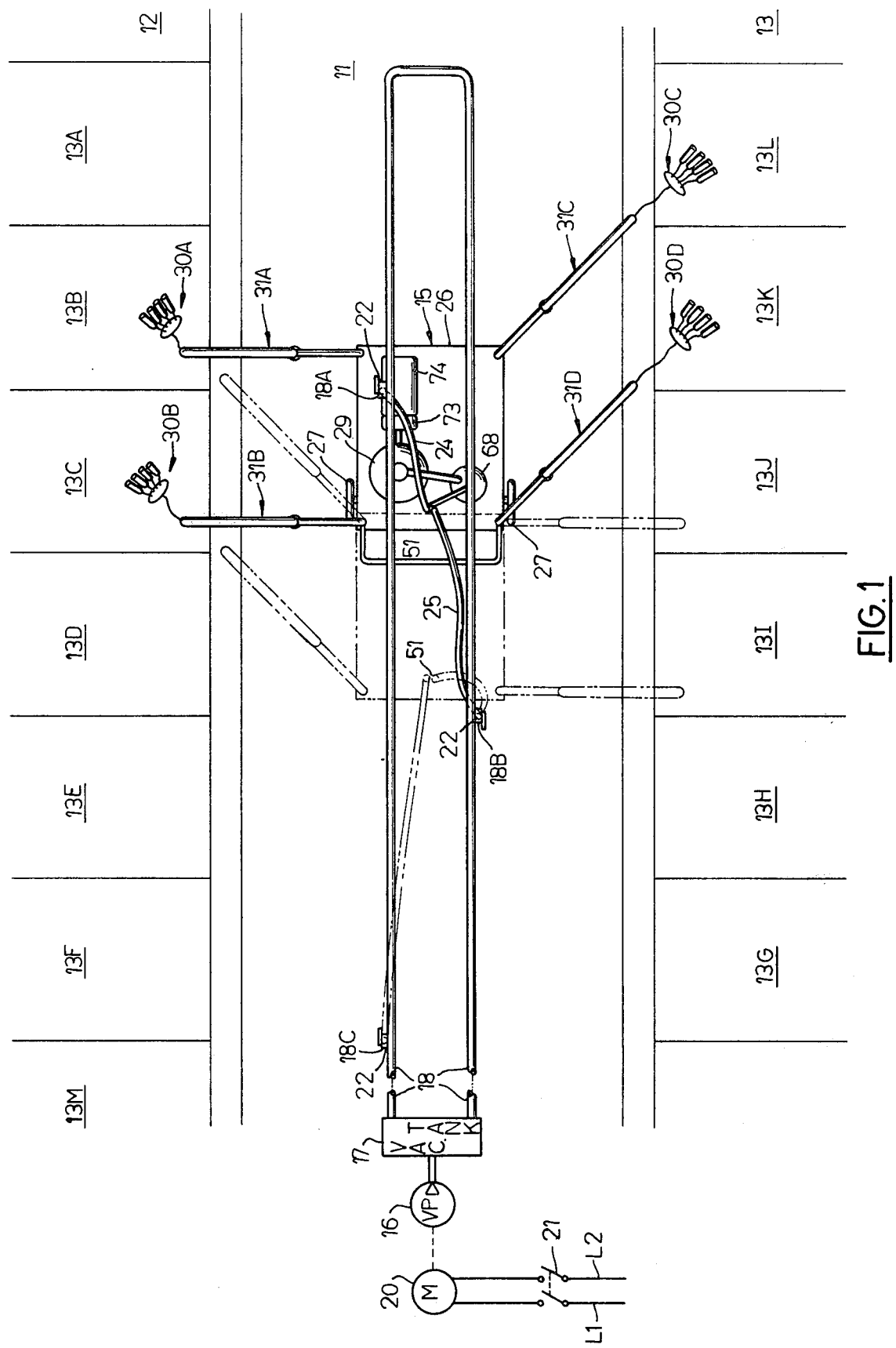
FIG. 1 is a top plan schematic view of dairy cow milking apparatus in accordance with the invention installed in a milking barn, the apparatus comprising a stationary main vacuum system, including a main vacuum line, and a mobile milking unit, including a pair of auxiliary vacuum lines and a plurality of teat claw assemblies.
Figure 4:
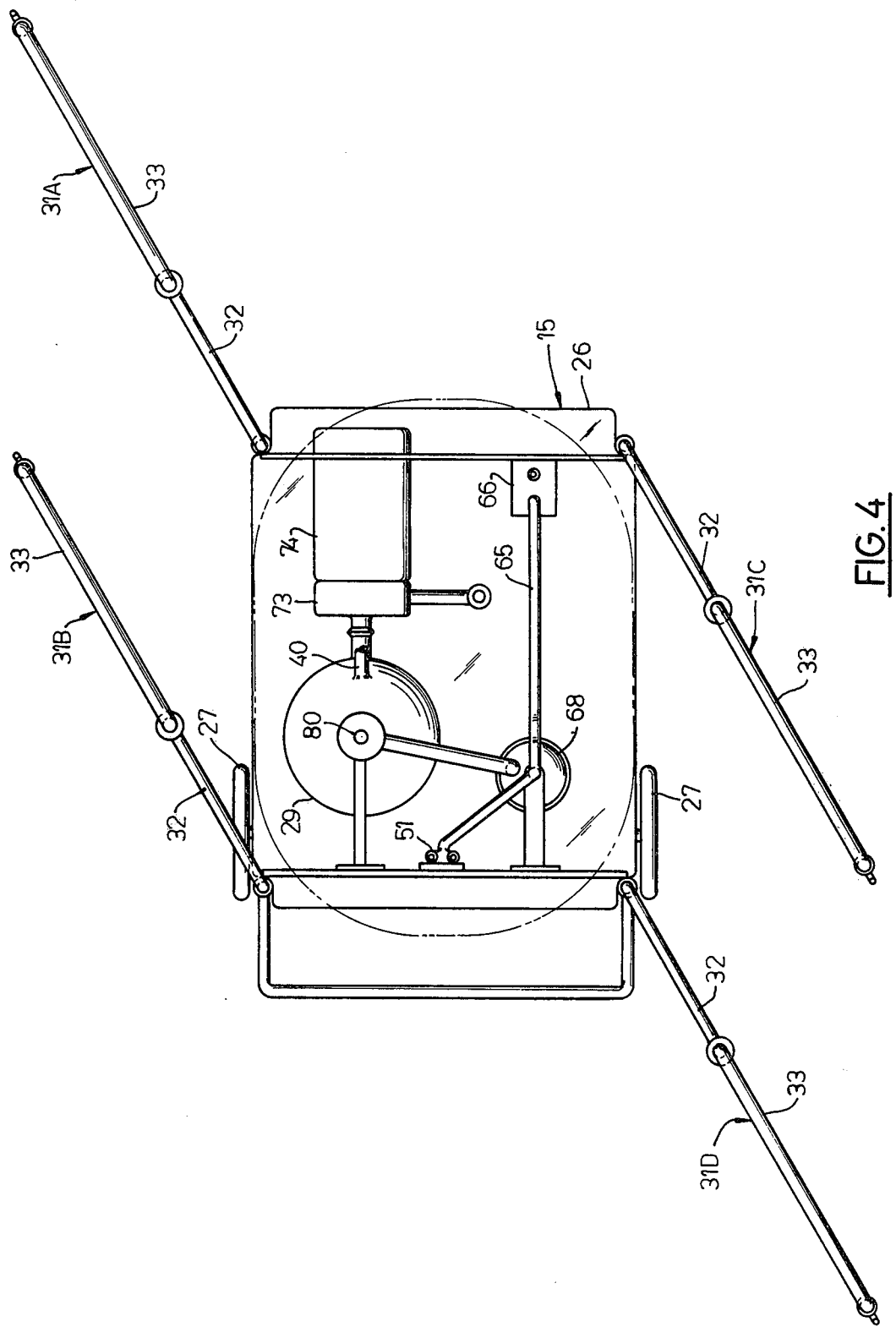
FIG. 4 is a top plan view of the milking unit shown in FIGS. 1 and 2.

FIGS. 1 and 2 show a milking barn wherein the apparatus and method in accordance with the invention are advantageously employed. The barn includes overhead rafters 10 and a concrete floor which is divided into a center aisle 11 and two cow assembly areas 12 and 13 on opposite sides of the aisle which are divided into stalls designated 13A through 13L. Twelve stalls are shown but more or less could be provided.

Figure 5:
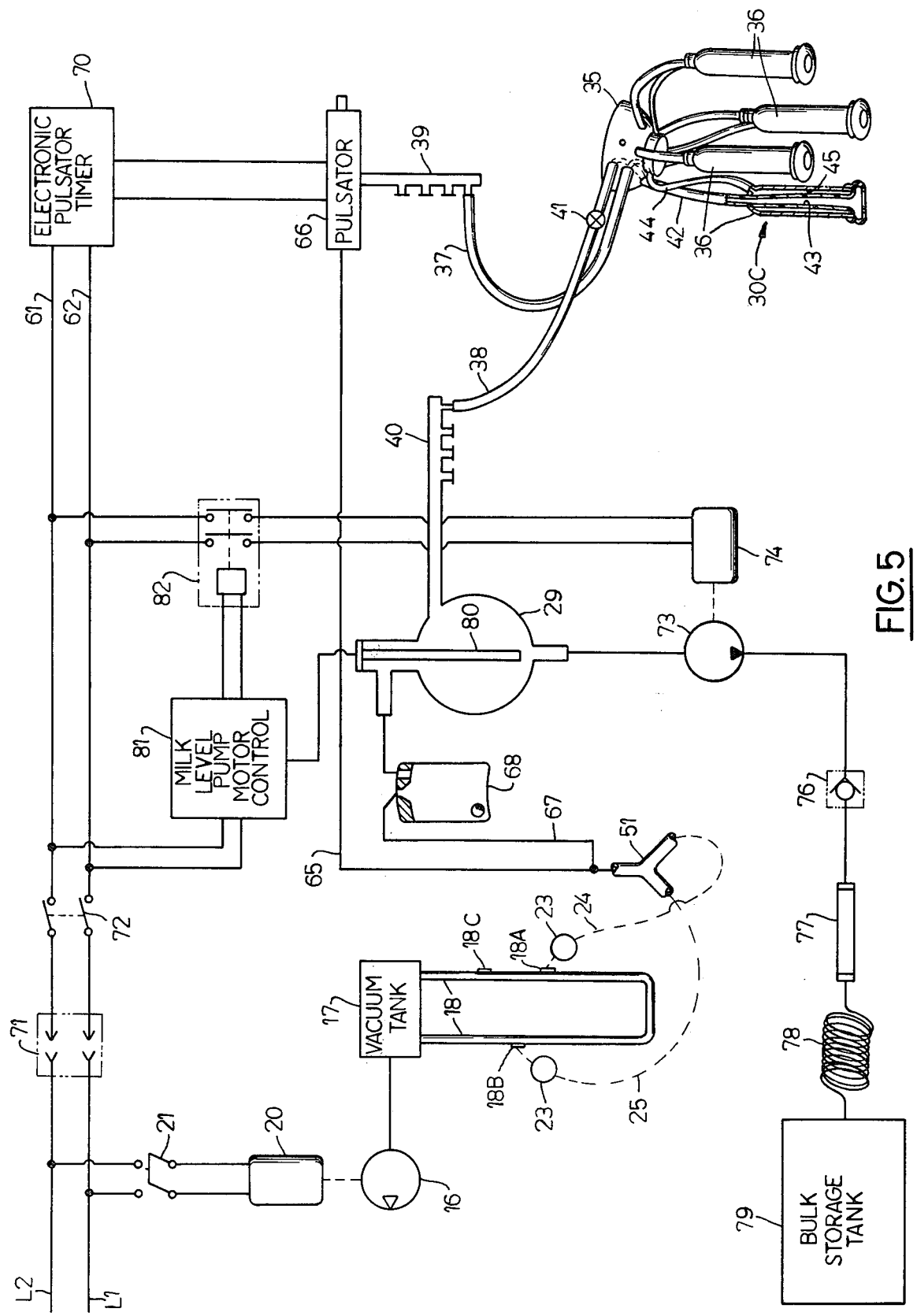
FIG. 5 is a schematic diagram of the apparatus in accordance with the invention and the electrical control system therefor.

The apparatus in accordance with the invention comprises a mobile milking unit 15 having vacuum operated components thereon and which is movable down aisle 11 from one position to another adjacent the stalls. The apparatus also comprises a vacuum system for operating the vacuum operated components on mobile milking unit 15 and includes a vacuum pump 16 which is installed in a convenient location in the barn and connected to a vacuum tank 17 which, in turn, is connected to the ends of a main vacuum line 18 which is suspended from the rafters 10 by suitable hangers 19 over aisle 11. Main vacuum line 18 is arranged in a loop having opposite sides which extend along the stalls. As FIGS. 1 and 5 show, vacuum pump 16 is driven by an electric motor 20 which is energizable from electric power supply lines L1 and L2 through a manually operable on/off switch 21. Vacuum pump 16 operates to maintain a constant vacuum in main vacuum line 18. Main vacuum line 18 is provided with a plurality of spaced-apart vacuum ports 18A through 18C arranged therealong in staggered relationship and each vacuum port is provided with a conventional manually operable gate type shut-off valve, such as 22 shown in FIG. 3, whereby a vacuum port can be opened for use and closed when not in use. Each vacuum port is adapted for connection with the end of a check valve 23 which is provided at the end of each of two flexible auxiliary vacuum lines 24 and 25 hereinafter described.

Referring to FIGS. 1, 2 and 3, mobile milking unit 15 comprises a frame 26 which is supported on a pair of main wheels 27 and a pair of caster wheels 28 and the frame supports the various components of the milking unit. Milking unit 15 comprises vacuum operated components such as a milk receiver 29 and a plurality of teat claw assemblies 30A, 30B, 30C and 30D; the latter being supported by a plurality of swing arms 31A, 31B, 31C and 31D, respectively. As hereinafter explained, the vacuum operated components on mobile milking unit 15 are connectable to main vacuum line 18 by means of a pair of auxiliary vacuum lines 24 and 25, either of which alone is capable of providing vacuum for all vacuum operated components on the milking unit.

Each swing arm has a lower portion such as 32 mounted near a corner of frame 26 which can be swung about a vertical axis relative to the frame and an upper portion such as 33 which can be swung about a vertical axis relative to the lower portion 32 so that the teat claw assembly carried by the swing arm can be moved to various convenient positions for milking.

The teat claw assemblies 30A, 30B, 30C and 30D are identical and only 30C, shown in FIGS. 1, 2 and 5, is hereinafter described in detail. As FIG. 5 shows, teat claw assembly 30C comprises a milk pan 35 to which four teat cups such as 36 are attached and from which a vacuum pulsator line 37 and a vacuumized milk delivery line 38 extend to a vacuum pulsator manifold 39 and a milk receiver manifold 40, respectively. Line 38 has a manually operable shut-off valve 41 therein which is closed when the teat claw assembly is not in use in order to maintain vacuum in the milk receiver. Vacuumized milk delivery line 38 is connected by means of a short flexible tube 42 to the teat-receiving interior of a flexible teat cup liner 43 in teat cup 36. Vacuum pulsator line 37 is connected by means of a short flexible tube 44 to a space 45 between the teat cup 36 and its liner 43.

As FIG. 5 best shows, the hereinbefore mentioned flexible auxiliary vacuum lines 24 and 25 each have one end connected to a check valve, such as check valve 23 shown in FIG. 3, and have the other end connected to a Y-connector or fitting 51. The check valve 23 comprises a two-piece housing 52 comprising an upper section 53 and a lower section 54 which are permanently engaged with each other in sealed relationship. The upper housing section 53 has a narrow cylindrical end 55 which is releasably engageable in the mouth of a vacuum port such as 18A, being functionally retained therein in sealed relationship by an O ring 56. The lower housing section 54 has a cylindrical flanged end 57 which is functionally engaged in sealed relationship in the free end of auxiliary vacuum line 24. Sections 53 and 54 cooperate to define a cylindrical chamber 60 wherein a check ball 61 of relatively soft plastic is disposed and into which a stop pin 62 extends. As FIG. 3 makes clear, when the check valve 23 is connected as shown and shut-off valve 22 is open, the vacuum operating in the direction of arrow A draws the ball 61 upward against the stop pin 62 and permits vacuum flow through auxiliary line 24 and past the ball. However, when the auxiliary line 24 with the check valve 23 attached is disconnected from a vacuum port such as 18A, the vacuum in line 24 operates in the direction of arrow B thereby causing the ball 61 to seat against opening 63 to effectively close line 24 from the atmosphere. Valve 22 is preferably closed prior to disconnection of the check valve therefrom.

As FIG. 5 shows, the Y-connector 51 is connected by a line 65 to a solenoid operated vacuum pulsator 66 to which pulsator manifold 39 is connected and also by a line 67 and through a moisture trap 68 to the milk receiver 29 to which milk receiver manifold 40 is connected. Thus, if either (or both) auxiliary line 24 and 25 is connected to a vacuum port, the lines 65 and 67 and the vacuum operated components connected thereto are able to operate.

Solenoid operated vacuum pulsator 66 is controlled by an electronic pulsator timer 70 which is energizable from lines 61 and 62 when the electrical connector 71 is plugged into the power source L1 and L2 and switch 72 is closed. Pulsator timer 70 controls the on-off time (for example, 0.6 seconds on time and 0.4 seconds off time) of pulsator 66 so as to provide alternate vacuum and atmosphere conditions to effect teat cup operation for milking.

A milk pump 73, driven by an electric motor 74, is provided for periodically discharging milk from receiver 29 through a one-way check valve 76, through a filter 77 and through a flexible tube 78 to a bulk storage tank 78 (shown in FIG. 5) which is understood to be located remotely from milking unit 15 and connectable to the free end of flexible tube 78. As FIG. 2 shows, flexible tube 78 is coiled on the upper portion of frame 26 and may be wound or unwound as needed as the mobile milking unit 15 is moved from one location to another.

Means are provided for energizing motor 74 to empty milk receiver 29 whenever the latter is filled to a certain level. Such means comprise probe means 80 in milk receiver 29 to sense the milk level therein and a milk level pump motor control means 81 energizable from the power source L1 and L2 when switch 72 is closed and responsive to the milk level in the receiver to actuate a milk pump motor controller 82 to operate milk pump 73 when the milk level in the receiver reaches a certain level to thereby empty the receiver.

Reference may be had to the aforementioned U.S. Pat. Application Ser. No. 600,813 for a detailed description of a suitable probe means 80, control means 81, pulsator 66 and pulsator timer 70 for use with a mobile milking unit in accordance with the present invention.

OPERATION

Referring to FIGS. 1 and 5, the method for operating the above described apparatus is as follows.

Assume that mobile milking unit 15 is placed in the position shown in solid lines in FIG. 1 near a first group of cows such as those in stalls 13B, 13C, 13L and 13K. Further assume that power source L1 and L2 is energized, that the line cord plug 71 is connected thereto and that the switches 21 and 71 are closed. Also assume that the shut-off valves 22 and the vacuum ports 18A, 18B and 18C in the main vacuum line 18 are initially closed and that both auxiliary vacuum lines 24 and 25 are disconnected. With the foregoing assumptions the motor 20 is energized and vacuum pump 16 is in operation thereby maintaining a vacuum in vacuum tank 17 and main vacuum line 1. Also assume that milk delivery tube 78 is connected to bulk storage tank 79.

If either the first or second auxiliary vacuum lines 24 or 25 is then connected to a vacuum port 18A, 18B or 18C, and the shut-off valve 22 for the port is opened, vacuum is supplied to vacuum pulsator 66 and to the milk receiver 29 to enable operation. Pulsator timer 70 which is energized causes the pulsator 66 to operate so that the vacuum pulsator manifold 39 alternately provides vacuum and atmospheric pressure to the four teat claw assemblies 30A, 30B, 30C and 30D. The vacuum condition in milk receiver 29 and its manifold 40 is transmitted through the lines 38 to the teat claw assemblies when the valves 41 are opened. Since there is no milk in the milk receiver, the milk pump 73 does not yet operate. However, as milking hereinafter occurs, the milk receiver 29 fills to a level whereat the sensing probe 18 effects operation of the milk level sensing control means 81 which in turn actuates contactor 82 to energized milk pump motor 74 to periodically operate the milk pump 73. Milk is pumped by milk pump 73 from milk receiver 29 through check valve 76, through filter 77, through milk tube 78 which has previously been connected to bulk storage tank 79.

As will be understood, some cows milk faster than others and, since their characteristic milking times are known, they can be arranged in appropriate order in the stalls to take advantage of their milking characteristics.

In FIG. 1, the first group of cows are in stalls 13B, 13C, 13L, 13K; the second group in stalls 13D, 13E, 13J, 13I; and the third group in stalls 13F, 13M, 13H, 13G. However, other arrangements are possible in accordance with the invention.

With the apparatus in readiness for operation, the method involves the steps of: placing the mobile unit 15 near the first group of cows; connecting the first and second auxiliary vacuum lines 24 and 25 to first and second vacuum ports 18A and 18B, respectively, near the first and second groups of cows, respectively; attaching the teat claw assemblies 30A, 30B, 30C, 30D to the first group of cows; completing milking of some cows (in stalls 13L and 13K) in the first group and detaching the appropriate teat claw assemblies 30C and 30D; reattaching the available teat claw assemblies 30C and 30D to cows (in stalls 13J and 13I) in the second group and commencing milking; completing milking of the remaining cows (in stalls 13B and 13C) in the first group and disconnecting the appropriate teat claw assemblies 30A and 30B; disconnecting the first auxiliary vacuum line 24 from the first vacuum port 18A; moving the mobile milking unit 15 nearer the second group of cows (in stalls 13D, 13E, 13J, 13I) while leaving the second auxiliary vacuum line 25 connected to port 18B and while continuing the milking of the cows (in stalls 13J, 13I) in the second group; reattaching the available teat claw assemblies 30A and 30B to other cows (in stalls 13D and 13E), respectively) in the second group and commencing milking thereof; reconnecting the first auxiliary vacuum line 24 to a third vacuum port 18C near the third group of cows in readiness for further movement of the milking unit; completing milking of some cows (in stalls 13I and 13J) in the second group; reattaching the available teat claw assemblies 30C and 30D to the cows (in stalls 13H and 13G) in the third group; and repeating the above steps as required.

In the foregoing description only a dozen stalls are shown. However, in large dairy farms many more stalls would be available and the invention would be even more advantageously employed.

We claim:
1. Milking apparatus comprising:
  a vacuum system including a main vacuum line installed along a plurality of milking stalls, a plurality of spaced-apart vacuum ports along said main vacuum line;
  first valve means for selectively and independently opening and closing each vacuum port;
  a mobile milking unit selectively movable from one position to another along said main vacuum line and said milking stalls, said unit comprising:
  vacuum operated components on said milking unit including a plurality of teat claw assemblies for milking a plurality of cows simultaneously; and
  a pair of flexible auxiliary vacuum lines on said milking unit, each auxiliary vacuum line having one end connected to operate all said vacuum operated components, each auxiliary vacuum line having its other end adapted for connection to a vacuum port in said main vacuum line, whereby at least one auxiliary vacuum line is always connected to said main vacuum line to permit continuation of milking as said mobile milking unit is moved from one position to another; and
  second valve means in each auxiliary vacuum line operative to close an auxiliary vacuum line whenever it is disconnected from a vacuum port.

2. Milking apparatus comprising:
  a vacuum pump;

a main vacuum line connected to said vacuum pump and installed along a plurality of milking stalls;

a plurality of spaced-apart vacuum ports along said main vacuum line;

first valve means for selectively and independently opening and closing each vacuum port;

a mobile milking unit selectively movable from one position to another along said main vacuum line and said milking stalls, said unit comprising:

a vacuum operated milk receiver;

a plurality of vacuum operated teat claw assemblies for milking a plurality of cows simultaneously and connected to convey milk to said milk receiver;

a vacuum operated pulsator operatively connected with said teat claw assemblies to alternately subject one or more selected teat claw assemblies to vacuum and atmospheric pressure; and a pair of flexible auxiliary vacuum lines, each auxiliary vacuum line having one end operatively connected to said milk receiver and to said pulsator, each auxiliary vacuum line having its other end adapted for connection to a vacuum port in said main vacuum line, whereby at least one auxiliary vacuum line is always connected to said main vacuum line to permit continuation of milking as said mobile milking unit is moved from one position to another; and second valve means in each auxiliary vacuum line operative to close an auxiliary vacuum line whenever it is disconnected from a vacuum port.

3. A method for milking cows positioned along a main vacuum line which has a plurality of space-apart vacuum ports therealong by means of a mobile milking unit which has a plurality of vacuum-operated teat claw assemblies thereon and also a pair of secondary vacuum lines, each of which alone can enable operation of said assemblies, comprising the steps of:

placing said unit in a first position near a first group of cows;

connecting one of said secondary vacuum lines to a first vacuum port near said first position;

attaching said teat claw assemblies to said first group of cows and commencing milking;

connecting the other of said secondary vacuum lines to a second vacuum port near a second group of cows to be milked;

completing the milking of at least some of said cows in said first group;

detaching the appropriate teat claw assemblies from those cows in said first group which have been completely milked;

disconnecting said one secondary vacuum line from said first vacuum port;

moving said milking unit near said second group of cows while said other secondary vacuum line is connected to said second vacuum port and while continuing to milk the remaining cows in said first group; and reattaching at least one of said appropriate teat claw assemblies to a cow in said second group;

4. A method according to claim 3 including the steps of closing each said vacuum port disconnected from a secondary vacuum line and closing each secondary vacuum line disconnected from a vacuum port.

5. A method for milking cows positioned along a main vacuum line which has a plurality of spaced-apart vacuum ports therealong by means of a mobile milking unit which has a plurality of vacuum-operated teat claw assemblies thereon and also a pair of first and second secondary vacuum lines, each of which alone can enable operation of said assemblies, comprising the steps of:

placing said unit in a first position near a first group of cows;

connecting said first secondary vacuum line to a first vacuum port near said first position;

attaching said teat claw assemblies to said first group of cows and commencing milking;

connecting said second secondary vacuum line to a second vacuum port near a second group of cows to be milked;

completing the milking of at least some of said cows in said first group;

detaching the appropriate teat claw assemblies from those cows in said first group which have been completely milked;

reattaching at least one of said appropriate teat claw assemblies to a cow in said second group and commencing milking;

disconnecting said first secondary vacuum line from said first vacuum port;

moving said milking unit near said second group of cows while said second secondary vacuum line is connected to said second vacuum port and while continuing to milk cows in said first and second groups;

connecting said first auxiliary vacuum line to a third vacuum port near a third group of cows to be milked;

completing the milking of the remaining cows in said first group;

detaching the appropriate teat claw assemblies from said remaining cows in said first group;

reattaching the appropriate teat claw assemblies to the remaining cows in the second group;

disconnecting said second auxiliary vacuum line from said second vacuum port;

moving said milking unit near said third group of cows while said first auxiliary vacuum line is connected to said third port and while milking of said cows in said second group continues; and repeating the above steps as required.

6. A method according to claim 5 including the steps of closing said each vacuum port disconnected from a secondary vacuum line and closing each secondary vacuum line disconnected from a vacuum port.

* * * * *